United States Patent [19]

Mosca

[11] Patent Number: 5,791,864
[45] Date of Patent: Aug. 11, 1998

[54] TABLE-CHANGING DEVICE FOR A MACHINE FOR WORKING PARTS

[75] Inventor: Claudio Mosca, Tenna, Italy

[73] Assignee: Salvagnini Italia S.p.A., Sarego, Italy

[21] Appl. No.: 780,188

[22] Filed: Dec. 26, 1996

[30] Foreign Application Priority Data

Dec. 29, 1995 [IT] Italy .............................. MI95 A 002778

[51] Int. Cl.$^6$ .................................................. B65G 35/00
[52] U.S. Cl. ........................................ 414/749; 198/468.6
[58] Field of Search .................................... 414/749, 750; 198/468.6; 269/56, 289 MR

[56] References Cited

U.S. PATENT DOCUMENTS 4,003,476  1/1977  Laskey .................................... 414/749
4,408,950  10/1983  Laskey .................................... 414/749

FOREIGN PATENT DOCUMENTS

0 457 104 A1  11/1991  European Pat. Off. .
0 490 020 A1  6/1992  European Pat. Off. .
0 681 888 A1  11/1995  European Pat. Off. .

*Primary Examiner*—Donald W. Underwood
*Attorney, Agent, or Firm*—Nixon & Vanderhye, P.C.

[57] ABSTRACT

A table-changing device for a machine for working parts comprises at least two working tables of which a first table is slidably supported by substantially rectilinear first rails so as to move from a first position of working to a second position of loading and unloading and vice versa translating horizontally, while a second table is slidably supported by second and third shaped rails provided with inclined portions, fixed with respect to the first rails. In this way the second table moves from the second position of loading and unloading to the first position of working and vice versa sliding on the second and third shaped rails, first lowering itself below the first table and then raising itself to the height of the first table, remaining horizontal.

10 Claims, 7 Drawing Sheets

TABLE-CHANGING DEVICE FOR A MACHINE FOR WORKING PARTS

This application is based on application No. M195 A 002778 filed in Italy, the content of which is incorporated hereinto by reference.

BACKGROUND

I. Field of the Invention

The present invention relates to a table-changing device for a machine for working parts.

II. Related Art and Other Consideration

In general, in machines for working metal or non-metal parts, the parts are supported by a table or working plane that, according to the type of working, can have different forms and structures. In particular, in machines that use a laser beam, plasma or oxygen cutting, for working operations (cutting, welding and such like) of metal parts, such as metal sheets, the parts to be worked are supported on a grille-type working table, also known as a "fakir's bed".

Given the need to perform operations of loading and unloading or in any case of preparation or equipping of the parts on the working tables, some machines are provided with two distinct working tables so that, during the operations of working the parts on one table, the other table is free for operations of loading and unloading and equipping of the parts.

Machines are known wherein two working tables are slidably supported on respective pairs of rectilinear and parallel rails. One of the tables can be lowered and raised by means of actuators that allow it to be lowered to perform the exchange of position with the other table and to be raised again to the height of the other table once the exchange has taken place. A motor and reduction gear with its transmission members controls the translational movements of the two tables. Hydraulic or electromechanical actuators control the movements of the table that can be lowered and raised.

These machines exhibit a considerable complexity of construction due to the presence of a motor and of hydraulic or electromechanical actuators that must operate in a synchronized manner.

It is an object of the present invention to provide a table-changing device for a machine for working parts that is simple from a construction viewpoint and accurate and reliable from an operating viewpoint.

SUMMARY

The abovementioned object is achieved, according to the invention, by a table-changing device for a machine for working parts comprising at least two working tables operatively connected to motor means to be driven to move from a first position of working said parts to a second position of loading and unloading of said parts and vice versa, a first working table being slidably supported by first substantially rectilinear rails so as to allow said first working table to move from said first position of working to said second position of loading and unloading and vice versa translating horizontally, characterized in that a second working table is slidably supported by second and third shaped rails provided with inclined portions and in that the position of said second and third shaped rails is fixed in respect of said first substantially rectilinear rails so as to allow said second table to move from said second position of loading and unloading to said first position of working and vice versa sliding on said second and third shaped rails first lowering itself below said first working table and then raising itself to the height of said first working table, remaining horizontal, while said first working table moves from said first position of working to said second position of loading and unloading and vice versa.

According to a preferred embodiment, said first and second working table are operatively connected to said motor means by at least one transmission chain, said first working table being made integral to a first branch of said transmission chain so as to translate horizontally, said second working table being connected to a second branch of said transmission chain by connecting means capable of displacing it from said second position of loading and unloading to said first position of working and vice versa, allowing it to lower itself and raise itself remaining horizontal, the movement of said chain causing the movement of said working tables in a reciprocally opposite direction, so as to perform the change of position of said tables.

The table-changing device according to the invention is highly advantageous because it has a simple and strong structure and allows the positioning of both tables to be performed with fast, accurate and safe operations.

In fact, the movement of translation of the two tables is performed using fixed paths, suitably shaped, being said second and third shaped rails fixed in respect of said first substantially rectilinear rails, and a single moving member formed by the transmission chain.

One of the two tables always translates along a rectilinear path, located on the outside of the path of the other table, and this allows moving parts with no limitations of height.

BRIEF DESCRIPTION OF THE DRAWINGS

Features and advantages of the invention will now be illustrated with reference to an embodiment represented as a non-limiting example in the enclosed figures, wherein.

DETAILED DESCRIPTION OF THE DRAWINGS

There is shown in FIGS. 1–8 a table-changing device, made according to the invention, for a machine for working metal parts, particularly sheet metal. Of the machine for working only the base structure 1 is shown, while a working head, for example for cutting, welding and such like, by means of a laser beam, is not shown.

The table-changing device comprises two grille-type, or fakir's bed, working tables 2 and 3, provided with respective supporting frames 4 and 5 with a quadrangular shape.

Figures 1, 2:
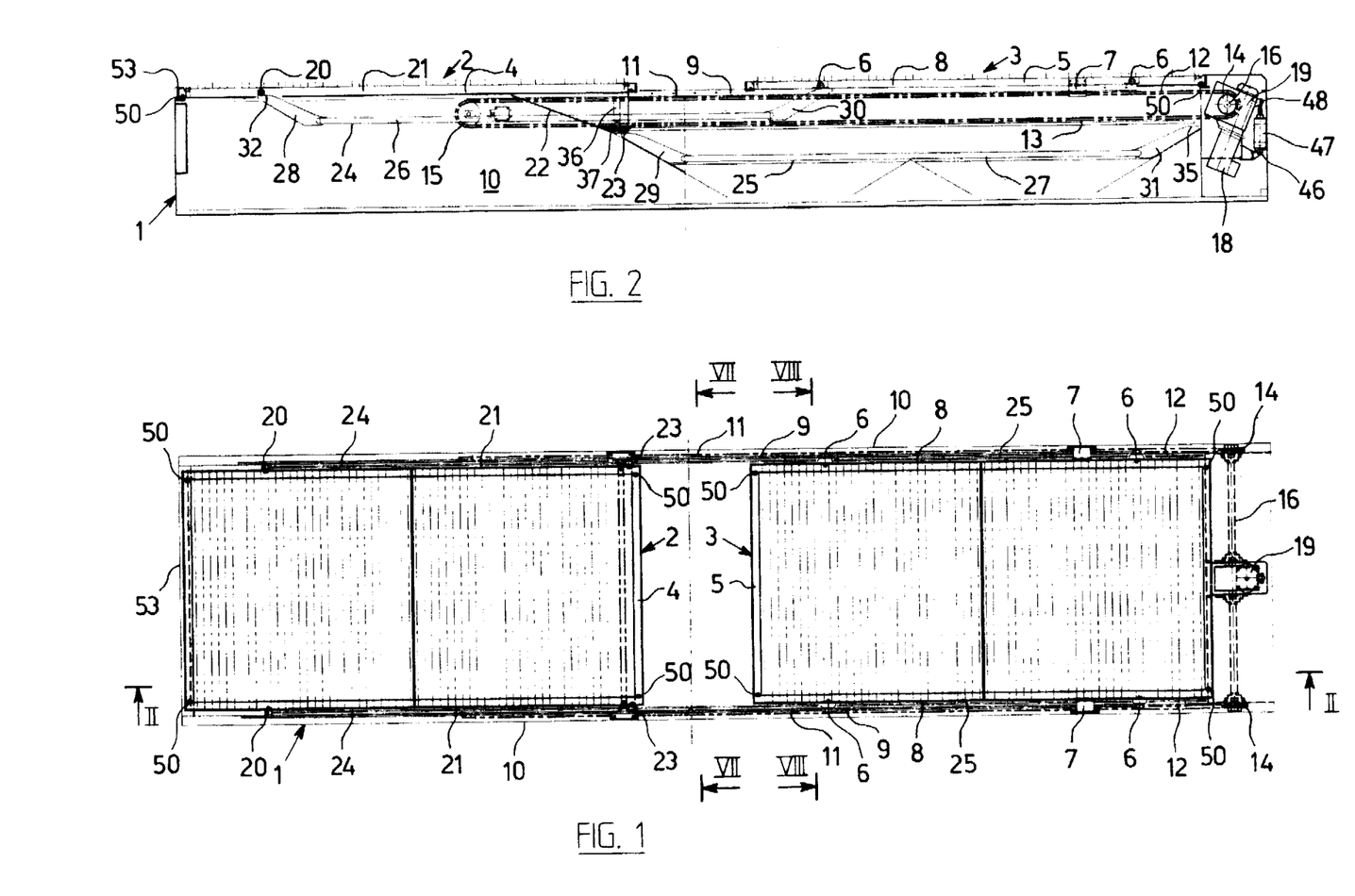
FIG. 1 is a view from above of a table-changing device, made according to the invention, for a machine for working parts.
FIG. 2 is a cross-sectional view taken along the plane II—II of FIG. 1.
Figure 3:
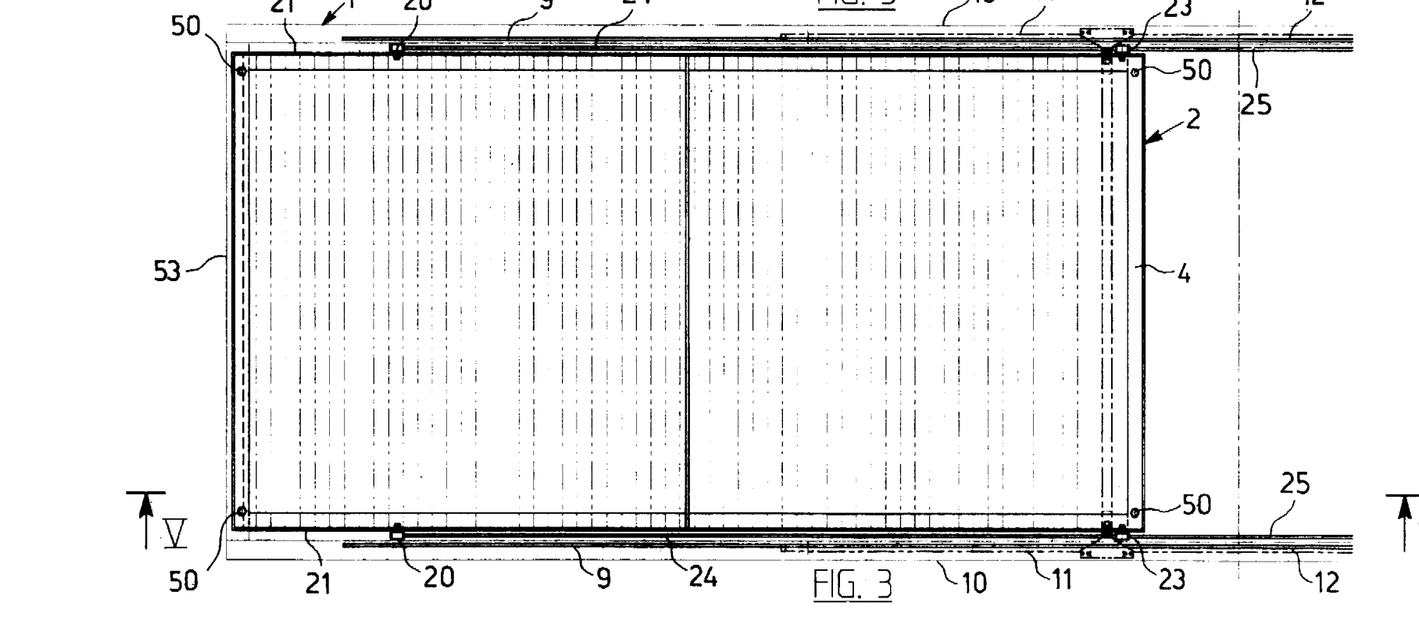
FIGS. 3 and 4 are partial views from above, on an enlarged scale, of the table-changing device of FIG. 1.
Figure 4:
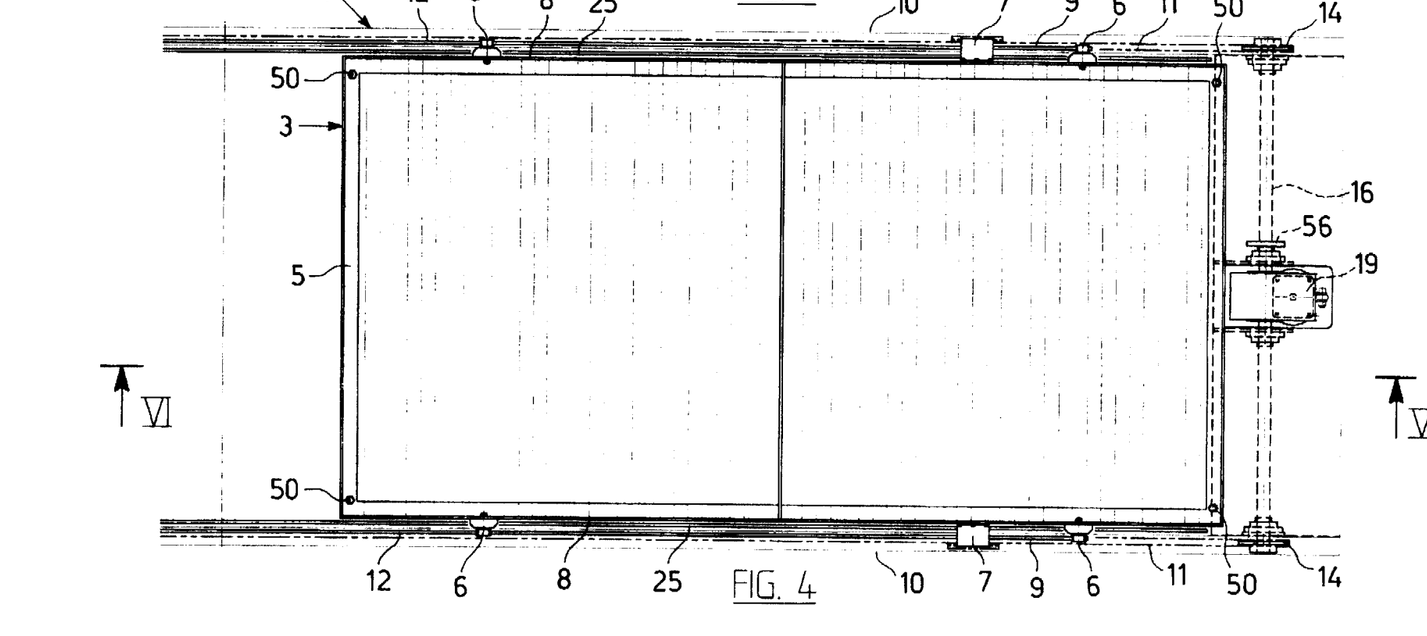
Figure 5:
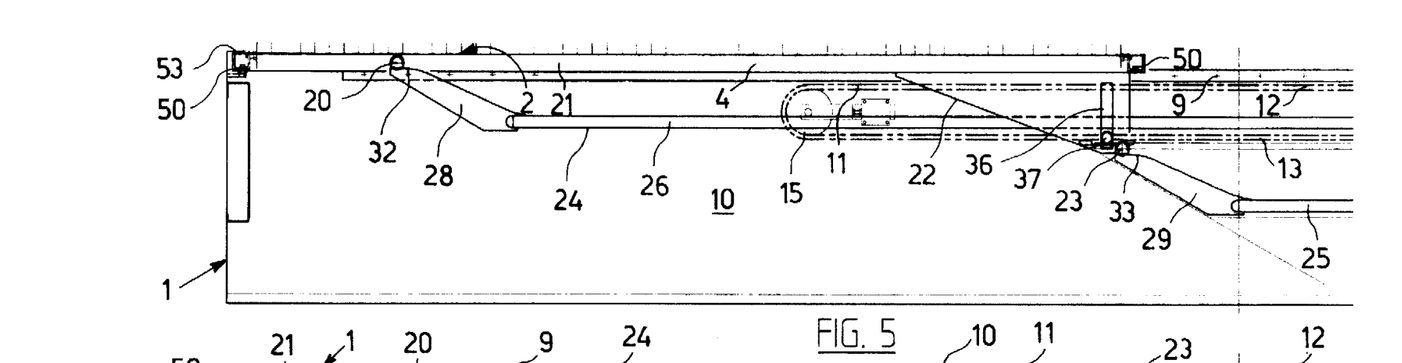
FIG. 5 is a partial cross-sectional view taken along the plane V—V of FIG. 3.

In the frame 5 of the working table 3 there are four idle rollers 6, two for each side 8. The rollers 6 are provided with a circumferential race and they are slidably supported by two lateral, rectilinear rails 9. The rails 9 are fastened to the sides 10 of the structure 1 and extend along almost their entire length in a longitudinal direction (FIGS. 1 and 2). The rails 9 form a horizontal path for the rollers 6 that allows the working table 3 to move from a position of loading and unloading (FIGS. 1, 2, 4 and 6) to a position of working and vice versa, wherein it takes the place of the table 2. The frame 5 is made integral with two transmission or movement chains 11, provided with upper branches 12 and lower branches 13, by means of two plates 7 fastened to its sides 8 and to the upper branches 12. The two chains 11 are drawn tight between two toothed driving pulleys 14 and two toothed idle pulleys 15, rotatably supported on the sides 10 of the structure 1. The driving pulleys 14 are integral with a transversal driving shaft 16, rotatably supported in the base structure 1 perpendicularly to the direction of translation of tables 2 and 3, and they are driven in rotation by a motor 18 through a non-reversible reduction gear 19 such as disclosed in U.S. Pat. No. 4,807,767. The motor 18 has its axis of rotation perpendicular to that of the shaft 16 and it is coaxial with the reduction gear 19. Motor and reduction gear have a pendulum execution, meaning that their weight is supported by the shaft 16, as will be illustrated later.

In the frame 4 of the working table 2 there are mounted two idle rollers 20, one for each side 21, and there are fastened two triangular plates 22, on lower vertices of which there are mounted two idle rollers 23, one for each side 21. The rollers 20 and 23 are provided with a circumferential race and they are rotatably supported by two respective shaped lateral rails 24 and 25, fastened to the sides 10 of the structure. The rails 24 and 25 are fixed in respect of the rails 9. The rails 24 and 25 have a substantially semi-sinusoidal (trapezoidal) configuration and they are formed by rectilinear central portions 26 and 27, respectively, by front and rear inclined portions (ramps) 28, 29 and 30, 31, respectively, and by front and rear rectilinear terminal portions 32, 33 and 34, 35, respectively (FIGS. 2, 5, 6 and 9). The rails 24 and 25 are longitudinally and vertically staggered. The front inclined portions 28 and 29 and the rear inclined portions 30 and 31 of the rails 24 and 25 are parallel and placed at a prechosen longitudinal distance, in relation to the stroke that the table 2 has to cover to move from a position of working (FIGS. 1, 2, 3 and 5) to a position of loading and unloading, wherein it takes the place of the table 3, and vice versa. The rectilinear central portions 26 and 27 of the rails 24 and 25 are placed at a prechosen vertical distance, in relation to the height of the triangular plates 22.

Figure 14:
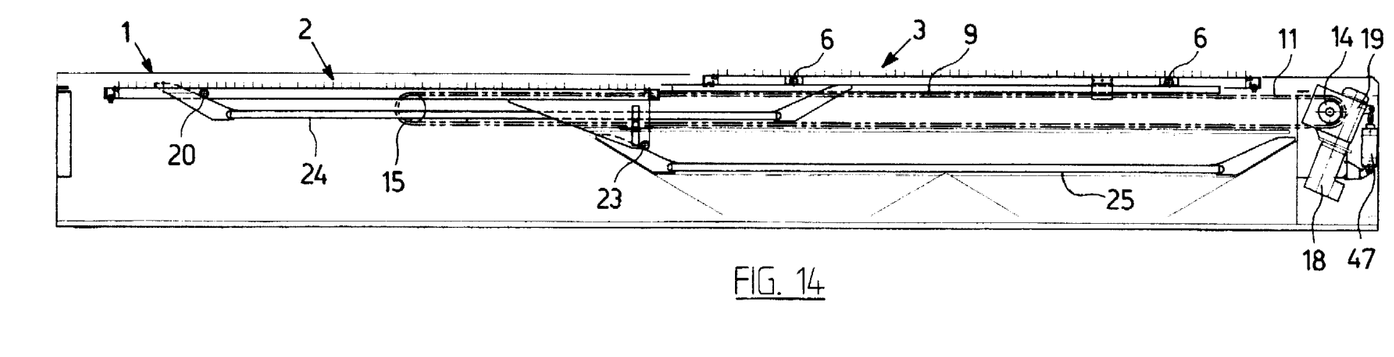
FIG. 14 is a lateral view of the table-changing device of FIG. 1 in a condition of movement of two tables.

The rails 24 and 25 form two substantially semi-sinusoidal paths, parallel, for the rollers 20 and 23 of the table 2 and allow the table 2 to lower itself below the table 3 and to raise itself to the height of the table 3, remaining horizontal to move from the position of working to the position of loading and unloading (FIG. 14). When the table 2 is in the position of working the rollers 20 and 23 rest on the rectilinear terminal portions 32 and 33 of the rails 24 and 25; when the table 2 is in the position of loading and unloading the rollers 20 and 23 rest on the rectilinear terminal portions 34 and 35 of the rails 24 and 25.

The rectilinear rails 9 are external, while the shaped rails 24 and 25 are internal (FIGS. 7 and 8), so that the rectilinear terminal portions 32 and 34 of the rails 24 are at the same height as the rails 9. The rails 9 are placed substantially above the rails 24 and 25 so that there is no limit to the height of the parts to be worked or worked arranged on the table 3. For example, in the case of the combination with a machine for laser operation, plasma or oxygen cutting, the table-changing device according to the invention allows not only the movement in the machine of sheets of flat material but also of shaped materials. The table 2 or the table 3, when they are in the position of working, carry the part to be worked, for example a sheet of metal, facing the working tools, such as a laser beam for cutting or welding, while, when they are in the position of loading and unloading they allow operations of removal of the worked parts and preparation of parts to be worked.

Figures 9, 10, 11:
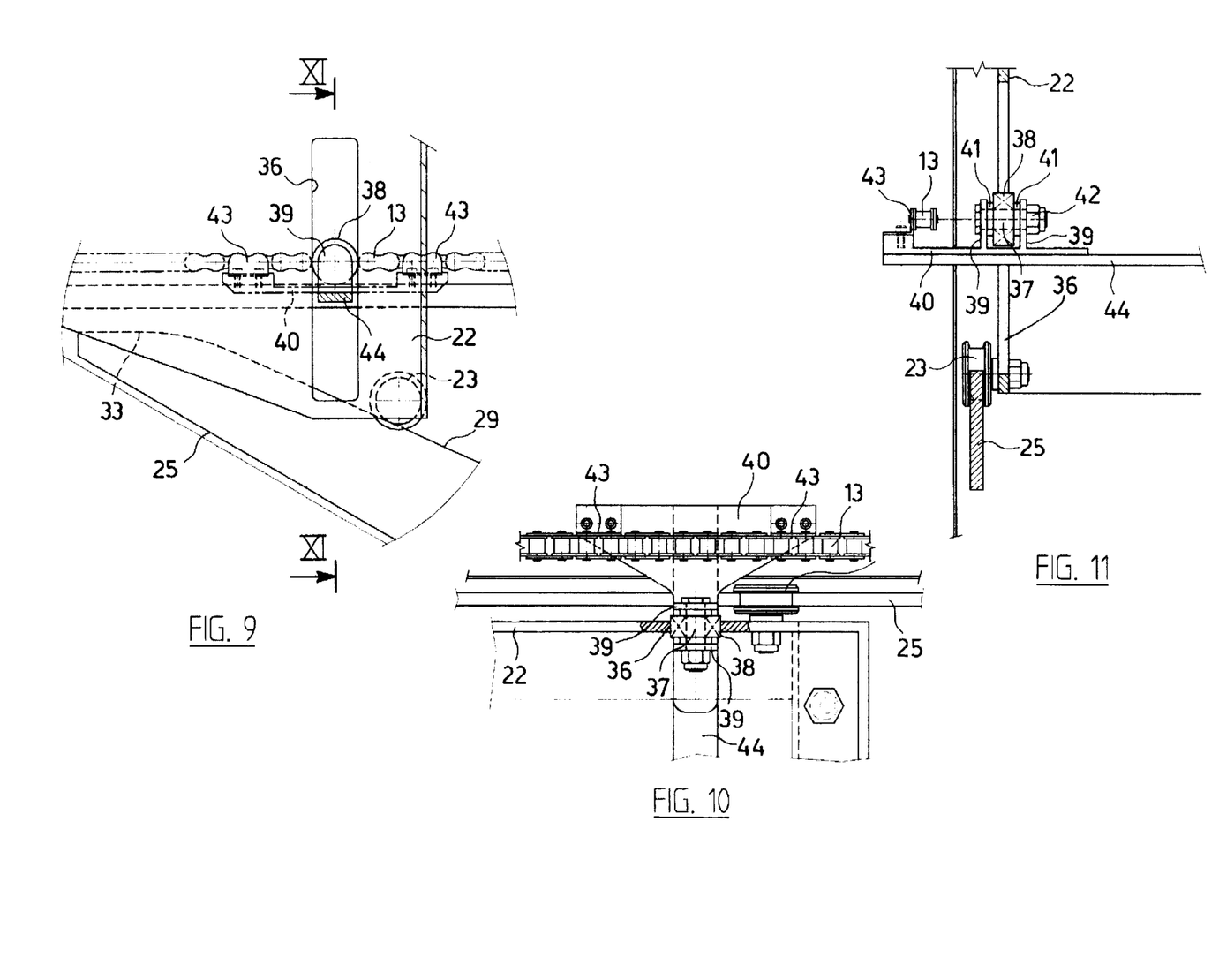
FIG. 9 is a front view on an enlarged scale of connecting means of a working table to a transmission chain shown in FIG. 2.
FIG. 10 is a view from above, partially sectioned, of the connecting means of FIG. 9.
FIG. 11 is a cross-sectional view taken along the plane XI—XI of FIG. 9.

Each of the two triangular plates 22, fastened to the table 2, is provided with a vertical slot 36 that engages with a threaded pivot 37 made integral with the lower branch 13 of one of the chains 11 (FIGS. 9, 10 and 11). Each pivot 37 is mounted in the respective slot 36 by means of a rolling bearing 38 and is fastened to flanges 39 of a "T"-plate 40 by means of spacers 41 and a nut 42. Each T-plate is fastened to the branch 13 by means of riveted brackets 43. The two "T"-plates located at the sides of the table 2 are joined together by means of a lamina 44. In that way, the table 2, while it is moved in a longitudinal direction by the branches 13 of the chains 11, is lowered and raised, guided by the rails 24 and 25.

The motor 18 and the reduction gear 19 are rotatably supported by the driving shaft 16. A fluid-dynamic (oleodynamic or pneumatic) linear actuator 47 is connected by means of a pivot 46 to the structure 1 and, by means of a pivot 48, to the motor 18 and the reduction gear 19. In that way, extensions and contractions of the linear actuator 47 cause clockwise and counter-clockwise rotations of the motor 18 and of the reduction gear 19 round the axis of the driving shaft 16 and consequent rotations of the same driving shaft 16 such as to cause the tables 2 and 3 to reach a final stop position, as will be illustrated later.

Figure 12:
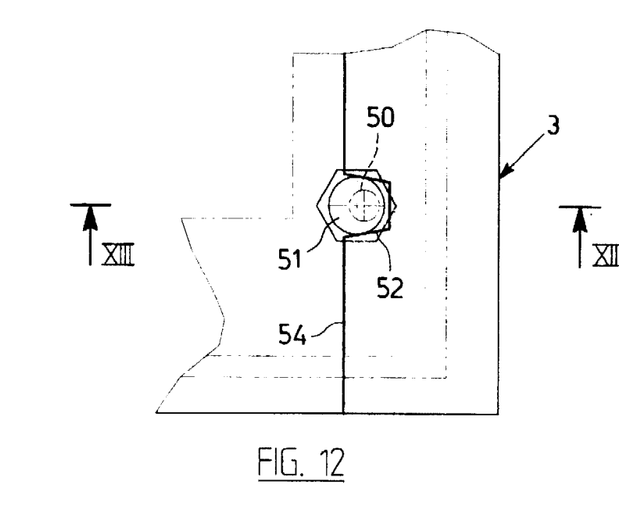
FIG. 12 is a view from below, on an enlarged scale, of a stop pivot and of a corresponding housing notch of a working table of the device of FIG. 1.
Figure 13:
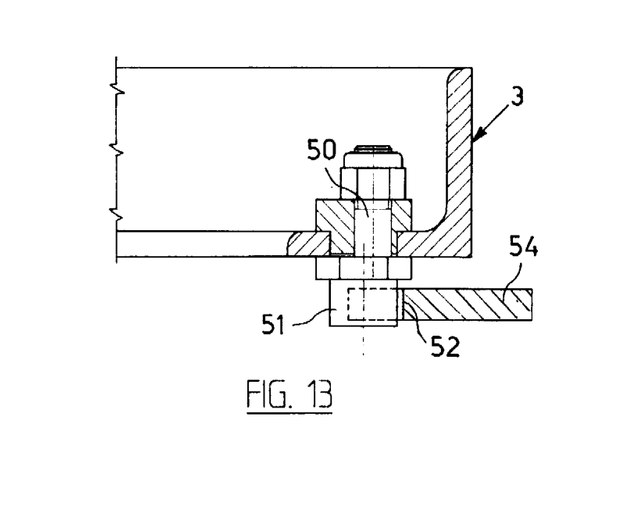
FIG. 13 is a cross-sectional view taken along the plane XIII—XIII of FIG. 12.

Each table 2 or 3 is provided with four pivots 50 with cams 51 capable of engaging four (trapezoidal) "V" notches 52 obtained in pairs on a front wall 53 and on a rear wall 54 of the structure 1, so as to act as stops when the tables 2 and 3 reach the final position, represented in FIGS. 1–6. By rotating the pivots 50, through the cams 51, it is possible to adjust the position of the axes of the pivots with respect to the notches 52 of the front wall 53 and of the rear wall 54 (FIGS. 12 and 13).

Figure 6:
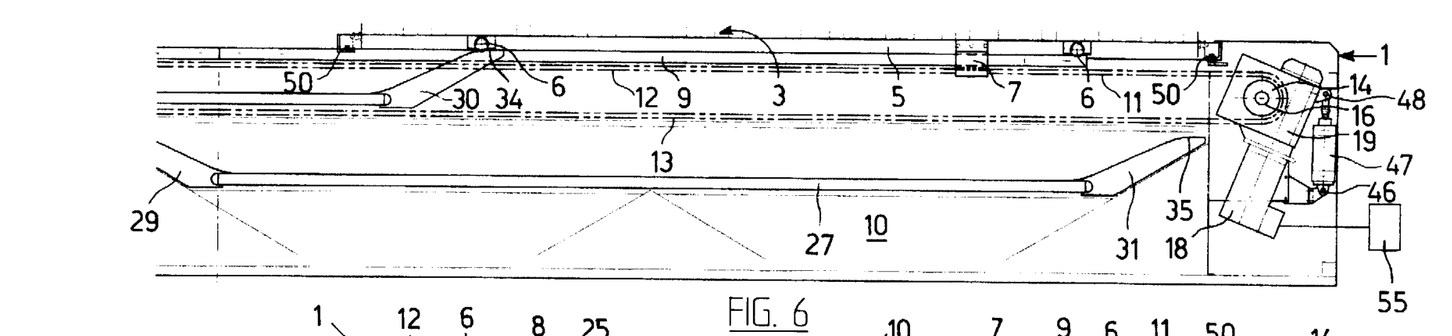
FIG. 6 is a partial cross-sectional view taken along the plane VI—VI of FIG. 4.
Figure 7:
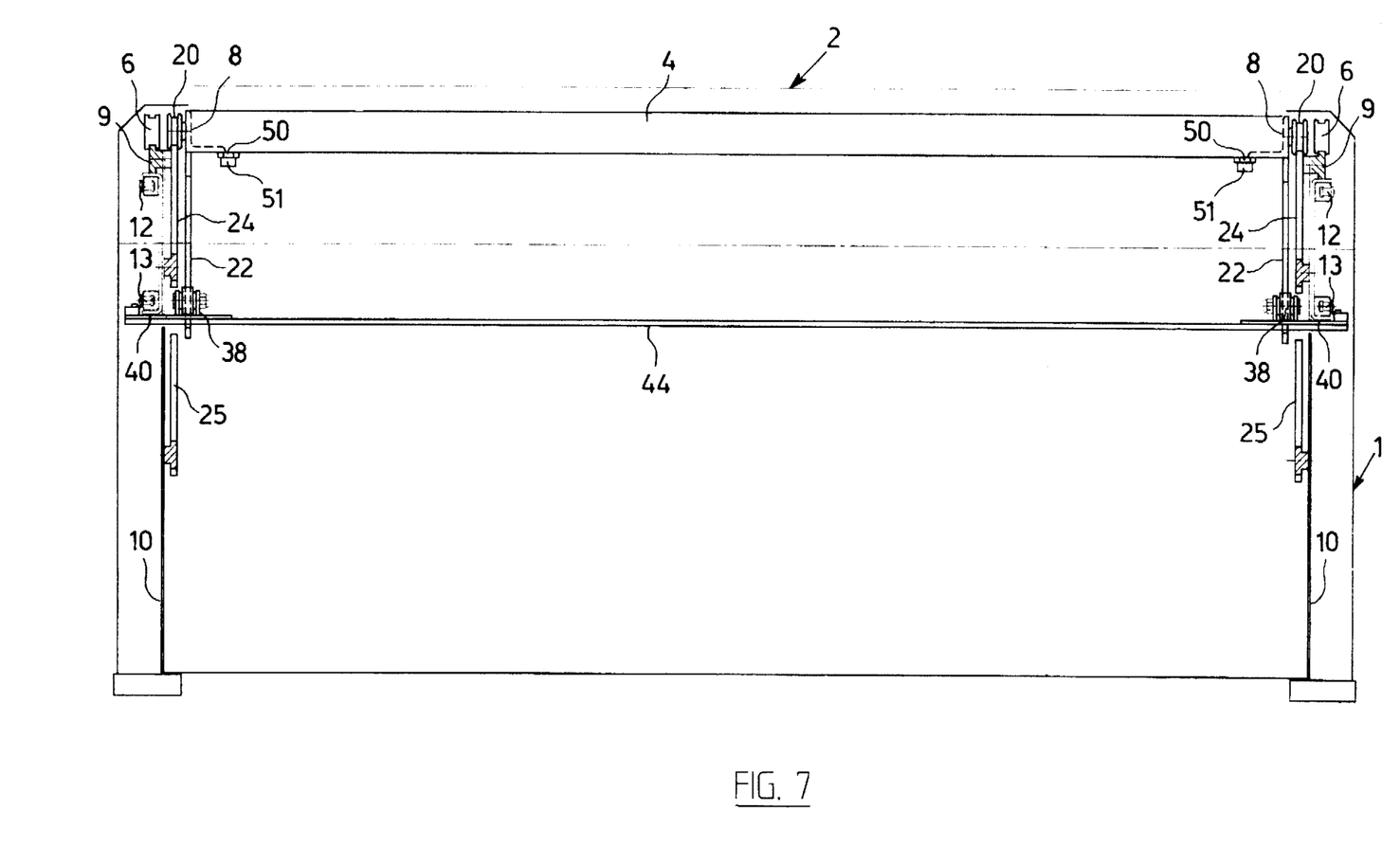
FIG. 7 is a cross-sectional view, on an enlarged scale, taken along the plane VII—VII of FIG. 1.
Figure 8:
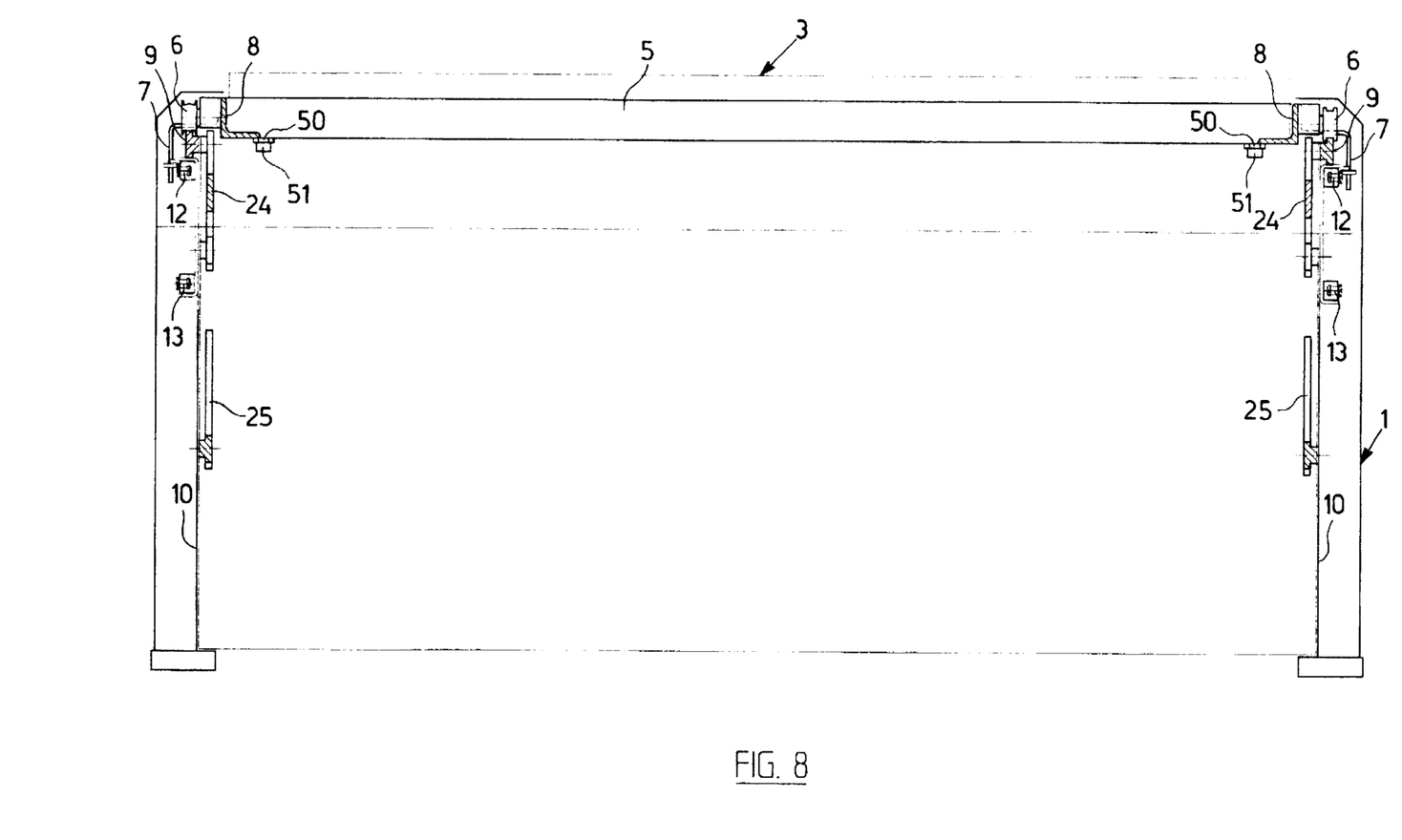
FIG. 8 is a cross-sectional view, on an enlarged scale, taken along the plane VIII—VIII of FIG. 1.

The motor 18 and the actuator 47 are controlled by an operator through an electronic control unit shown diagrammatically with a block 55 (FIG. 6). In order to read the translation of the tables 2 and 3 a position transducer is used formed by an angular transducer 56 coaxially placed with the driving shaft, so that it is independent of the actual position of the tables.

When the motor 18 is in operation, it causes the chains 11 to move through the reduction gear 19, the driving shaft 16 and the pulleys 14. The movement of the chains 11 causes the movement of the tables 2 and 3 in a reciprocally opposite direction so as to perform the change in the position of the tables. While the working table 2 moves from the position of working to the position of loading and unloading and vice versa sliding on the rails 24 and 25 and following a substantially semi-sinusoidal pathway, the working table 3 moves from the position of loading and unloading to the position of working and vice versa, translating horizontally along the rails 9.

When the motor 18 is placed in rotation, the tables 2 and 3 are displaced until they are in the proximity of the required final stop position. At this point the motor 18 is stopped and thanks to the actuator 47, that extends or contracts, an additional rotation of the motor 18 and of the reduction gear 19 is performed round the axis of the driving shaft 16. Given the irreversibility of the reduction gear 19, this additional rotation causes the rotation of the shaft 16 and thus final translations of the tables 2 and 3 in the opposite direction. In this way, in the final step of the positioning of the tables 2 and 3, the cams 51 of the pivots 50 engage with the notches 52 and center the tables horizontally with respect to the structure 1.

The use of the fluid-dynamic actuator 47 for this final translation of the working tables 2 and 3 allows the combination of the mechanical accuracy in positioning and the repeatability of the final stop position of the tables, performed with the actuator, with the movement of the tables performed with the transmission chains 11. In fact, the fluid-dynamic actuator 47 and the irreversible reduction gear 19 allow the completion of the positioning of the working tables 2 and 3 ensuring a high level of accuracy and repeatability of the final positioning of the tables.

The final positioning of the tables 2 and 3 with a high degree of accuracy is a particularly important requirement when the table-changing device is used to feed machines for laser operations, plasma or oxygen cutting, or in any case for very accurate working operations wherein it is required that the position of the table supporting the part to be worked be repeated with great accuracy.

In the table-changing device according to the invention the fixed rails 9, 24 and 25 that form the paths of the tables 2 and 3 are integral with the structure 1 with no part in movement. The movement of exchanging the tables takes place simply thanks to the motion of the transmission chains 11 and to the sliding of the tables 2 and 3 on the rails 9, 24 and 25 that in any case maintain the tables 2 and 3 always in a horizontal position. In order to raise or lower the table 3 use is made of the inclined portions of the rails 24 and 25 and no other members are required.

I claim:

1. A table-changing device for a machine for working parts comprising at least two working tables operatively connected to motor means to be driven to move from a first position of working said parts to a second position of loading and unloading of said parts and vice versa, a first working table being slidably supported by first substantially rectilinear rails so as to allow said first working table to move from said first position of working to said second position of loading and unloading and vice versa translating horizontally, characterized in that a second working table is slidably supported by second and third shaped rails provided with inclined portions and in that the position of said second and third shaped rails is fixed with respect to said first substantially rectilinear rails so as to allow said second table to move from said second position of loading and unloading to said first position of working and vice versa sliding on said second and third shaped rails first lowering itself below said first working table and then raising itself to the height of said first working table, remaining horizontal, while said first working table moves from said first position of working to said second position of loading and unloading and vice versa.

2. A table-changing device according to claim 1, characterized in that said first and second working table are operatively connected to said motor means by means of at least one transmission chain, said first working table being made integral to a first branch of said transmission chain so as to translate horizontally, said second working table being connected to a second branch of said transmission chain by connecting means capable of displacing it from said second position of loading and unloading to said first position of working and vice versa, allowing it to lower itself and raise itself remaining horizontal, the movement of said chain causing the movement of said working tables in a reciprocally opposite direction, so as to perform the change of position of said tables.

3. A table-changing device according to claim 1, characterized in that said second and third rails have a substantially semi-sinusoidal configuration being provided with respective rectilinear central portions connected to said inclined portions and with rectilinear terminal portions.

4. A table-changing device according to claim 3, characterized in that said second and third rails are staggered longitudinally and vertically, front inclined portions of said second and third rails and rear inclined portions of said second and third rails being substantially parallel and placed at a predetermined longitudinal distance one from the other and said rectilinear central portions of said second and third rails being placed at a predetermined vertical distance one from the other.

5. A table-changing device according to claim 3, characterized in that said second working table is slidably supported by said fixed second and third rails by means of first and second pairs of idle rollers, said second working table being provided with two triangular plates, on lower vertices of which there are mounted said second pair of idle rollers.

6. A table-changing device according to claim 5, characterized in that said second working table rests by means of said first and second pairs of idle rollers on said rectilinear terminal portions of said second and third rails when it is at the height of said first working table.

7. A table-changing device according to claim 5, characterized in that each of said triangular plates is provided with a vertical slot that engages with a pivot made integral with said lower branch of said transmission chain by means of flanges and a "T"-plate, so that said second table, while it is moved in a longitudinal direction by said lower branches of said chain, lowers itself and raises itself, guided by said second and third rails.

8. A table-changing device according to claim 5, characterized in that said rails are supported by a base structure and said working tables are provided with pivots equipped with cams capable of engaging with "V"-shaped notches obtained in a front wall and in a rear wall of said base structure, so that said working tables are centered with respect to said base structure when they assume a final stop position.

9. A table-changing device according to claim 3, characterized in that said motor means are operatively connected to a driving shaft rotatably supported in said base structure and, in turn operatively connected to said transmission chain, said motor means being rotatably supported by said driving shaft, a linear actuator being connected by first pivot means to said base structure and by second pivot means to said motor means so that extensions and contractions of said linear actuator cause clockwise and anti-clockwise rotations of said motor means round the axis of said driving shaft and consequent rotations of said driving shaft such as to cause said first and second working table to attain said final stop position.

10. A table-changing device according to claim 1, characterized in that said first, second and third rails are fastened to sides of a base structure.

* * * * *